United States Patent
Dawidowsky et al.

(10) Patent No.: US 7,499,429 B2
(45) Date of Patent: Mar. 3, 2009

(54) OPTIMIZING DATA TRAFFIC IN AN AD-HOC ESTABLISHED DEVICE NETWORK

(75) Inventors: Frank Dawidowsky, Stuttgart (DE); Lothar Stadelmeier, Stuttgart (DE)

(73) Assignee: Sony Deutschland GmbH, Koeln (DE)

(*) Notice: Subject to any disclaimer, the term of this patent is extended or adjusted under 35 U.S.C. 154(b) by 1250 days.

(21) Appl. No.: 10/233,095

(22) Filed: Aug. 30, 2002

(65) Prior Publication Data

US 2003/0058819 A1 Mar. 27, 2003

(30) Foreign Application Priority Data

Sep. 3, 2001 (EP) .................................. 01121100

(51) Int. Cl.
*H04Q 7/00* (2006.01)

(52) U.S. Cl. ........................ 370/331; 455/436

(58) Field of Classification Search .................. None
See application file for complete search history.

(56) References Cited

U.S. PATENT DOCUMENTS

| | | | | |
|---|---|---|---|---|
| 5,513,210 | A * | 4/1996 | Vook et al. | 375/133 |
| 6,370,369 | B1 * | 4/2002 | Kraiem et al. | 455/277.1 |
| 6,587,680 | B1 * | 7/2003 | Ala-Laurila et al. | 455/411 |
| 6,751,196 | B1 * | 6/2004 | Hulyalkar et al. | 370/252 |
| 6,751,455 | B1 * | 6/2004 | Acampora | 455/414.1 |
| 2001/0012757 | A1 * | 8/2001 | Boyle | 455/11.1 |
| 2001/0029197 | A1 * | 10/2001 | Hulyalkar | 455/574 |
| 2002/0110105 | A1 * | 8/2002 | Awater et al. | 370/338 |
| 2002/0142771 | A1 * | 10/2002 | Saifullah et al. | 455/436 |
| 2003/0058819 | A1 | 3/2003 | Dawidowsky et al. | |

FOREIGN PATENT DOCUMENTS

WO WO 98 52375 11/1998

OTHER PUBLICATIONS

"Broadband Radio Access Networks (BRAN): Hiperlan Type 2: System Overview" ETSI TR 101 683 V1.1.1. Feb. 8, 2000. pp. 1-20. XP002176358.

"Broadband Radio Access Networks (BRAN); Hiperlan Type 2; Data Link Control (DLC) Layer; Part 4: Extension for Home Environment:" ETSI TR 101 683 V1.1.1. 'Online! Dec. 2000. pp. 61-69, XP002184083.

Royer E M et al: "A Review of Current Routing Protocols for Ad Hoc Mobile Wireless Networks" IEEE Personal Communications. IEEE Communications Society, US, vol. 6, No. 2, Apr. 1999. pp. 46-55. XP000823968.

U.S. Appl. No. 11/875,694, filed Oct. 19, 2007, Dawidowsky et al.

* cited by examiner

*Primary Examiner*—Bob A Phunkulh
(74) *Attorney, Agent, or Firm*—Oblon, Spivak, McClelland, Maier & Neustadt, P.C.

(57) ABSTRACT

In order to optimize data traffic in an ad-hoc established device network, the data traffic is monitored in order to determine which amount of the data traffic to and from a specific device is reflected by the central controller. Reflected data streams should be avoided because they increase the load of the network. If more than a predefined amount of said data traffic is reflected by the central controller, and if the specific device is a controller-capable device, a handover of the control functionality is performed in order to establish said specific terminal device as the new central controller. Thus, reflected data streams are reduced.

22 Claims, 3 Drawing Sheets

Before Hand-Over

After Hand-Over

Before Hand-Over

After Hand-Over

OPTIMIZING DATA TRAFFIC IN AN AD-HOC ESTABLISHED DEVICE NETWORK

CROSS-REFERENCE TO RELATED APPLICATIONS

This application claims priority to the European patent with the Serial No. 01121100.0, filed on Oct. 1, 2002 at the European Patent Office.

BACKGROUND

The invention is related to ad-hoc established device networks, which comprise a central controller and a set of terminal devices. In particular, the invention is related to a method for optimizing data traffic in an ad-hoc established device network, to a central controller for controlling a set of terminal devices in an ad-hoc established device network, and to a gateway device for connecting the device network with an external network.

For a variety of home multimedia applications and business applications, it is important to establish networks, preferably wireless networks, for exchanging data and messages between different devices that are part of the network. In a typical business application scenario, a mobile terminal gets services over a fixed corporate or public infrastructure. In an exemplary home application scenario, a low-cost and flexible networking is supported to interconnect wireless digital consumer devices.

The ETSI Project BRAN (Broadband Radio Access Networks) has defined the standard HIPERLAN (High Performance Radio Local Area Network), which provides high-speed multimedia communications between different broadband core networks and mobile terminals. HIPERLAN/2 provides a flexible platform for a variety of business and home applications that can support a set of bit rates up to 54 Mbit/s. The HIPERLAN/2 standard is an example how data can be transmitted between different devices in a wireless network. The invention is not limited to wireless networks according to the HIPERLAN/2 standard, though. The invention is not limited to wireless networks. It can also be applied in wired networks.

A typical device network comprises several devices, with one of the devices acting as a central controller that controls the other devices which act as terminal devices. When different devices are brought within reach of each other, they start exchanging messages and establish a so-called ad-hoc network. The first device on the ad-hoc network is taking the control functionality of the network. In case more than one controller-capable device exist in the network, any of these devices could become the first device on the network and thus the network's central controller.

In the so-called centralized mode, a data packet that is sent from a first terminal device to a second terminal device has to be routed via the central controller. The data stream from the first terminal device to the second terminal device is "reflected" by the central controller. The reflected data streams cause a lot of extra data traffic; they increase the network load significantly.

Most device networks comprise a gateway device which provides a connection between the ad-hoc established device network and external networks, e.g. the Internet. Outbound data traffic that is sent from a terminal device to the gateway has to be routed via the central controller, and thus, a reflected data stream is generated. Inbound data traffic arriving at the gateway also has to be routed via the central controller before it is distributed to the respective terminal device. Again, reflected data streams are generated.

SUMMARY

It is an object of the invention to provide a method and means for optimizing data traffic in an ad-hoc established device network in order to use the bandwidth of the device network more efficiently.

The object of the invention is solved by a method for associating a new device with an ad-hoc established device network according to claim 1, by a central controller for controlling a set of terminal devices according to claim 14 and by a computer program product according to claim 21.

The inventive method for optimizing data traffic in an ad-hoc established device network comprising a central controller and a set of terminal devices comprises a step of monitoring the data traffic in order to determine, with respect to a specific terminal device, which amount of the data traffic from said specific terminal device and/or to said specific terminal device is reflected by said central controller. In case that at least a predefined amount of the data traffic from said specific terminal device and/or to said specific terminal device is reflected by said central controller, it is checked whether said specific terminal device is capable of acting as a controller. In case said specific terminal device is capable of acting as a controller, a handover of the control functionality is performed in order to establish said specific terminal device as the new central controller.

Whenever a specific device of the ad-hoc network is involved—either as a source or as a destination—in a data traffic that is routed via the central controller and that causes a reflected data stream, it is checked whether the control functionality can be transferred to the specific device. A transfer of the control functionality to said specific device is only considered if the amount of reflected data traffic exceeds some predefined threshold. A handover of the control functionality is only initiated if the specific device is a controller-capable device. In case the specific device is not controller-capable, the central controller continues controlling the network.

By establishing the specific device as a new central controller of the network, the data traffic in the network is significantly reduced. Data packets are directly exchanged between the specific device and a terminal device, and the reflected data streams are not required any longer. The inventive method helps to reduce the data traffic in a device network. Superfluous reflected data traffic can be avoided, and thus, the load of the network is reduced. This means that the bandwidth of the network can be used more efficiently.

Preferably, the former central controller is associated as a terminal device with the new central controller. After the handover, the former central controller still is part of the network.

Preferably, the central controller tracks the source addresses of data packets in order to determine which amount of the data traffic from said specific terminal device is reflected by said central controller. Each data packet comprises a header with the packet's source and destination address. If the data streams from a certain source frequently cause reflected data streams, it should be considered to transfer the control functionality to said source.

Alternatively or additionally, the central controller can track the destination addresses of data packets in order to determine which amount of the data traffic to said specific terminal device is reflected by said central controller. If a certain destination device is frequently involved in data traffic causing reflected data streams, it might be a good solution if said destination device takes the control of the network.

According to a preferred embodiment of the invention, said specific terminal device is a gateway device which connects the device network with an external network. Via the gateway, data packets are exchanged with external networks. For these data packets, the centralized mode is active. Therefore, outbound traffic has to be routed via the central controller to the gateway. Inbound traffic also has to be routed via the central controller before it is distributed to the various terminal devices. If the central controller and the gateway device are two different devices, reflected data streams are generated. In this situation, the reflected data streams can be avoided if the gateway device becomes the central controller of the network. In this situation, the best solution is to make the gateway device control the network, because this allows to avoid a lot of superfluous reflected data traffic. When the gateway device acts as the central controller, the best performance on the transmission channel is achieved, and data throughput is significantly improved.

Preferably the central controller monitors the inbound data traffic which is received by said gateway device from the external network, and which is reflected by the central controller to a destination device. Alternatively or additionally, the central controller monitors the outbound data traffic which is reflected by the central controller from a source device to said gateway device, and which is sent by said gateway device to the external network. For deciding whether a handover of the control functionality is justified or not, it is possible to consider only the amount of the inbound data traffic. Alternatively, it is possible to consider only the amount of outbound data traffic, or to consider both the inbound and the outbound traffic.

Preferably, the check whether said specific terminal device is capable of acting as a controller is performed with a database which is kept on part of the central controller. Whenever a new device associates with the network, the central controller is informed whether the new device is controller-capable or not. Therefore, the central controller can easily maintain and update a database.

According to a preferred embodiment of the invention, each device of the network is notified that it is no longer controlled by the former central controller, and that it is furtheron controlled by the new central controller, whenever a handover of the control functionality is performed. Any interference between the former central controller and the new central controller can thus be avoided.

Preferably the network is a wireless network, and in particular a network according to the HIPERLAN/2 standard.

The inventive gateway device is used in an ad-hoc established device network comprising a central controller and a set of terminal devices, whereby said gateway device connects the device network with an external network. Said gateway device is capable of acting as a central controller of the device network. In order to optimize the data traffic within the network, it is important that the gateway device is capable of acting as a controller. When the data traffic with external networks, particularly with the internet, exceeds a certain amount, the control functionality should be transferred to the gateway device.

BRIEF DESCRIPTION OF THE SEVERAL VIEWS OF THE DRAWINGS

Further features and advantages of a preferred embodiment according to the present invention will be explained below in conjunction with the accompanying drawings, in which.

DETAILED DESCRIPTION

Figure 1A:
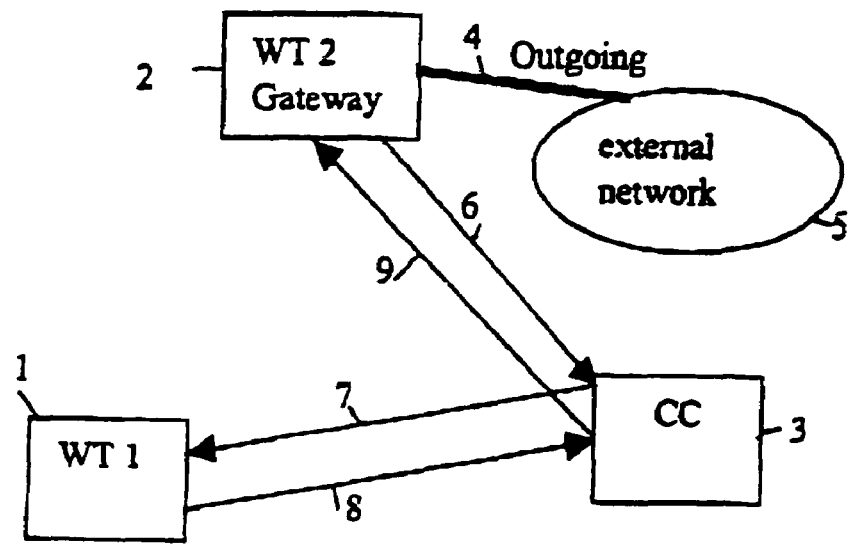
FIG. 1A shows the structure of the device network before the control functionality is handed over to the gateway device.

In FIG. 1A, the structure of an ad-hoc established device network is shown, which comprises two wireless terminals, the wireless terminal 1 and the gateway device 2, and a central controller 3. According to the HIPERLAN/2 standard, the first device on the ad-hoc network is taking the control functionality of this network. Central controller 3 has been the first device on the ad-hoc network, and for this reason it controls the wireless terminals 1 and 2.

The gateway device 2 establishes a connection 4 between the device network and the external network 5. The data traffic from the device network to the external network (outbound traffic) and the data traffic from the external network to the device network (inbound traffic) are both routed via the gateway device 2 and the connection 4.

On the connection 4, the Ethernet protocol is used. Inbound data traffic from the external network 5 is transported via the HIPERLAN/2 protocol. For the data packets of the inbound data traffic, the centralized mode is active. Therefore, even data packets whose destination address is the wireless terminal 1 are first transmitted (6) to the central controller 3. There, the data traffic from the gateway device 2 is reflected and the data packets are transmitted (7) to the wireless terminal 1, which is their destination address.

Outbound data traffic is transmitted from its source, the wireless terminal 1, via the gateway device 2 to the external network 5. The destination address of the data packets that are part of the outbound traffic is the so-called default route, which indicates any destination address outside of the device network. Also for the outbound data traffic, the centralized mode is active. The data packets issued by the wireless terminal 1 are therefore transmitted (8) to the central controller 3. The central controller 3 reflects (9) the arriving data packets to the gateway device 2. There, the outbound data traffic is transmitted via the connection 4 to the external network 5.

If the gateway device 2 is capable of acting as a controller for the device network, the control functionality can be handed over from the central controller 3 to the gateway device 2.

Figure 1B:
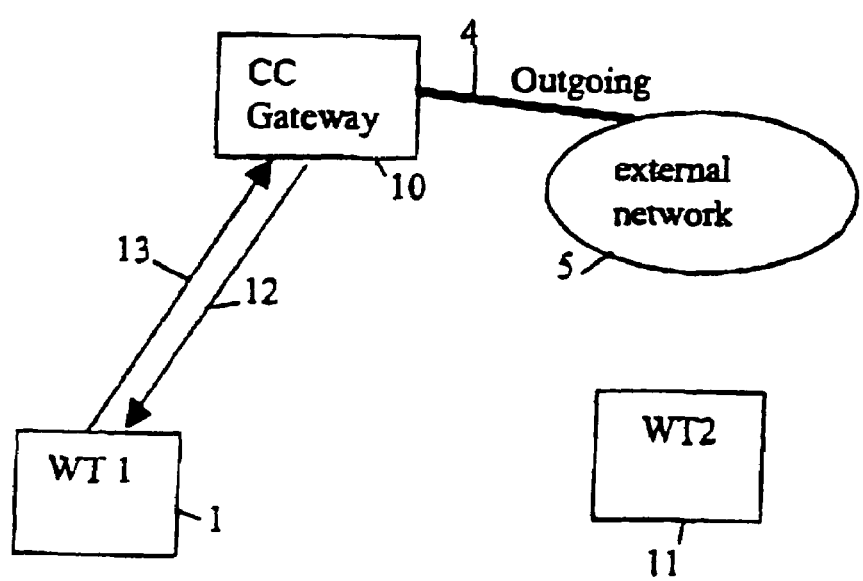
FIG. 1B shows the structure of the device network after the control functionality has been handed over to the gateway device.

FIG. 1B shows the structure of the network after the handover has been performed. The control functionality has been transferred to the former gateway device 2, which now is the new central controller 10. The former central controller 3 does not control the device network any more. It has become a wireless terminal 11 which is associated with the network. The wireless terminal 11 is controlled by the new central controller 10.

The inbound data traffic is transmitted from the external network 5 via the connection 4 to the new central controller 10, which is the network's gateway device. There, the packets are converted into the protocol of the internal network, and they are transmitted (12) to their destination address, e.g. to the wireless terminal 1.

The outbound data traffic, which comprises all data packets with the default route as a destination address, is transmitted (13) from its source address, e.g. from the wireless terminal 1, to the new central controller 10. There, the data packets are converted into the protocol of the external network and transmitted, via the connection 4, to the external network 5.

From FIG. 1B, it can be seen that by performing a handover of the control functionality, the data traffic within the device network can be significantly reduced. Instead of four data streams 6, 7, 8, 9 as in FIG. 1A, in FIG. 1B only two data streams 12 and 13 are necessary. The reflected data streams 7 and 9 in FIG. 1A, which were necessary for connecting the former central controller 3 to the gateway device 2, are no longer required, because in FIG. 1B, the new central controller 10 is at the same time the network's gateway device. By transferring the control functionality to the gateway device, the network load can be significantly reduced.

Figure 2:
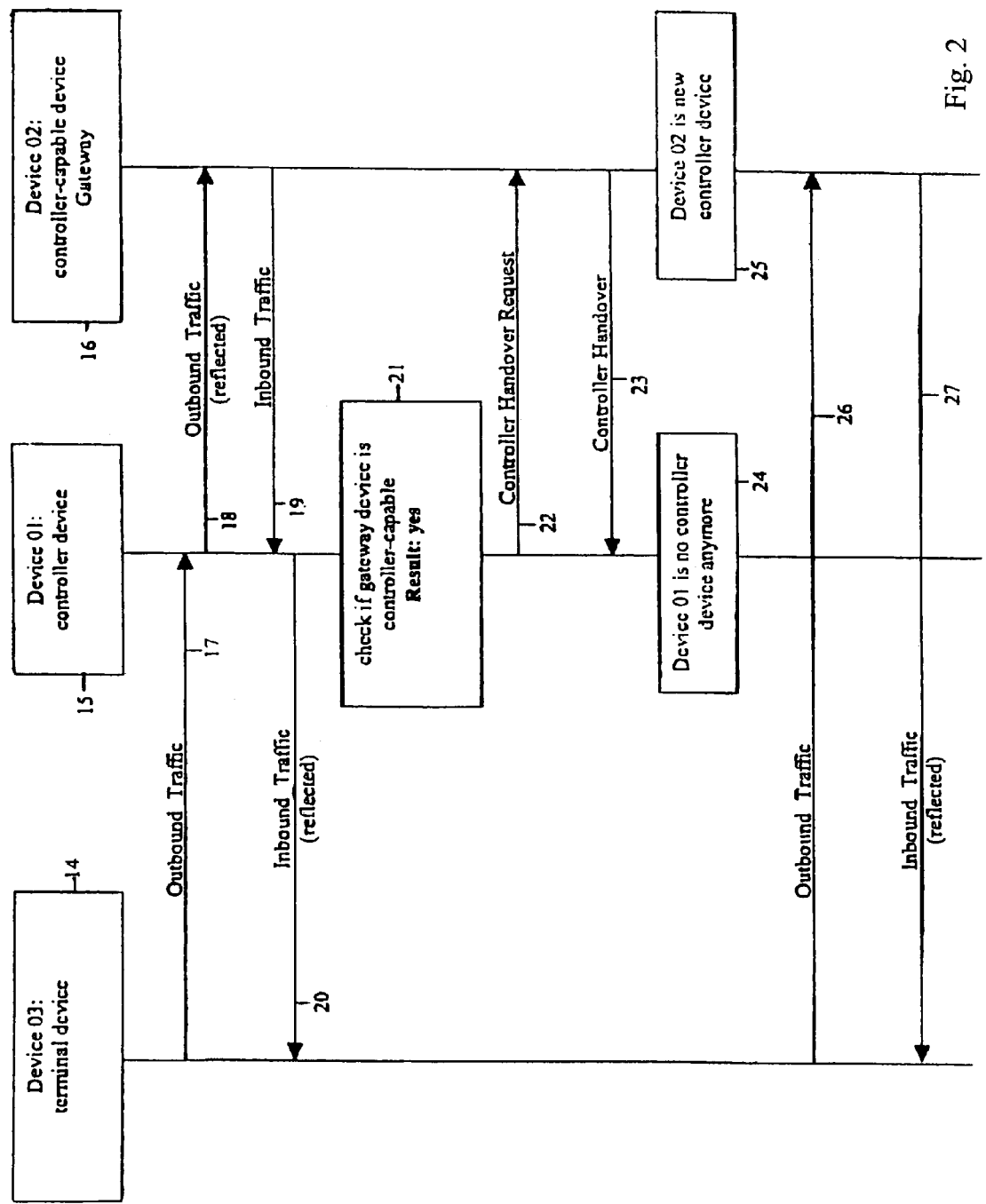
FIG. 2 shows the messages that are exchanged between the network devices in order to establish the gateway device as the network's new central controller.

In FIG. 2, the messages and data traffic streams exchanged between the wireless terminal 14, the central controller 15 and the controller-capable gateway device 16 are shown. Initially, the device network is of the structure shown in FIG. 1A; and the gateway device 16 does not control the device network. Outbound traffic is transmitted (17) from its source, the wireless terminal 14, to the central controller 15. The central controller 15 reflects (18) the outbound traffic to the controller-capable gateway device 16, which acts as a gateway to external networks. Vice versa, inbound traffic from the external network arrives at the controller-capable gateway device 16. For data packets from an external network, the centralized mode is active, and therefore the inbound traffic is forwarded (19) to the controller device 15. There, a reflected inbound data stream is generated. According to the destination address of the data packets, the data packets are transmitted (20) e.g. to the wireless terminal 14.

In order to optimize the data traffic in the device network, the central controller monitors where the data packets come from and where they are sent. In the header of each data packet, both the source address and the destination address is specified. Outbound data traffic is characterized in that the source address is any wireless terminal address and the destination address is the default route. Inbound data traffic is characterized in that the source address is the default route and the destination address is any wireless terminal address.

The central controller permanently monitors how frequently the various source addresses and/or destination addresses occur. This can be done by counting the number of packets with a certain source address and/or with a certain destination address for a large number of data packets and comparing the count values with predefined threshold values. Thus, it is possible to find out which source addresses or destination addresses occur more frequently than others.

In case the default route occurs rather frequently as a destination address, there is a lot of outbound data traffic. In case the central controller is not identical with the gateway device, a lot of reflected data traffic is generated. In this case, the central controller will suggest to perform a handover of the control functionality to the gateway device 16 in order to avoid the reflected data traffic.

In case the default route occurs rather frequently as a source address, there is a lot of inbound data traffic. Also in this case a lot of superfluous reflected data traffic is generated if the central controller device is not the same device as the gateway device. Also in this case, the central controller will suggest a handover of the control functionality to the gateway device 16 in order to reduce the amount of reflected data traffic.

The scope of the invention is not limited to transferring the control functionality to the gateway device. By monitoring the frequency of occurrence of the data packets' source addresses and/or destination addresses, any device address that occurs rather frequently can be detected. If the address of a specific device occurs rather often as a source or destination address, it might make sense to transfer the control functionality to said device, because this will reduce the amount of reflected data traffic.

Before the handover of the control functionality is performed, it has to be checked whether the gateway device, or, in more general terms, the specific device whose address occurs rather frequently, is capable of acting as a controller of the network. This check is performed in step 21. The handover is only initiated if the gateway device is a controller-capable device. In order to keep track of the controller-capabilities of the various network devices, the central controller maintains a local database. Said local database comprises a record for each device of the network indicating whether the respective device is controller-capable or not. Whenever a new device is associated with the device network, a record is added to said database.

In order to initiate the handover of the control functionality, a Controller Handover Request 22 is sent from the former central controller 15 to the controller-capable gateway device 16. The controller-capable gateway device 16 accepts the handover request by returning a Controller Handover message 23 to the former central controller 15. The former central controller 15 notifies all the devices associated with the network that it will no longer control them, and that the control functionality will be passed to the controller-capable gateway device 16. Additionally, the former central controller 15 notifies its own convergence layer that it will stop acting as a controller.

So far, the former central controller 15 has been responsible for updating and maintaining the database containing information about the controller-capabilities of the various devices. This database has to be transmitted to the controller-capable gateway device 16 when the control functionality is transferred to the controller-capable gateway device 16. Then, in step 24, the former central controller 15 stops acting as a controller of the network.

In step 25 the controller-capable gateway device 16 becomes the new central controller of the network, From now on, the gateway device 16 as the new central controller is responsible for updating and maintaining the database. The former central controller 15 becomes an associated wireless terminal that is controlled by the gateway device 16. All the devices associated with the network are notified that the gateway device 16 has taken over the control functionality, and that they will furtheron be controlled by the gateway device 16.

Now, outbound traffic 26 sent by the wireless terminal 14 is directly transmitted to the gateway device 16, which is the network's central controller. From there, the outbound traffic is distributed to external networks. A reflected data stream within the device network does not occur any more. Inbound data traffic 27, which arrives at the gateway device 16, is directly forwarded to its respective destination, e.g. to the wireless terminal 14. Also here, reflected data streams do not occur any more.

Figure 3:
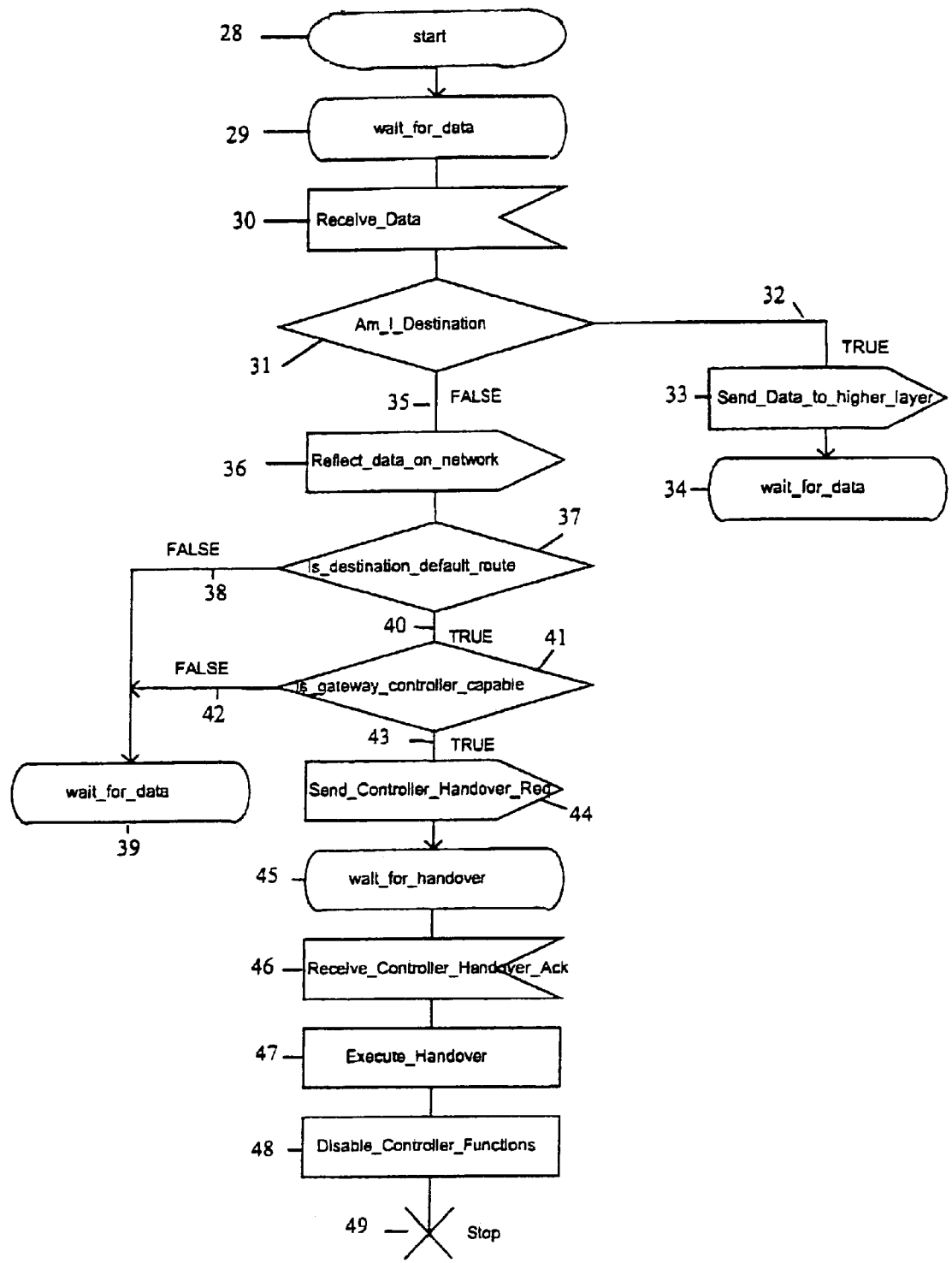
FIG. 3 shows a flow chart for realizing the traffic based handover of the control functionality according to the invention.

In FIG. 3, a flow chart for implementing the invention is shown. The program represented by this flow chart can either be implemented in hardware or in software. The program is executed on part of the device that acts as the central controller of the network.

When the program is started (28), it enters the wait_for_data mode 29. In this mode, the central controller waits for data packets from other terminal devices of the network. In step 30, Receive_Data, the central controller receives data packets issued by another device of the network. Each data packet comprises a header with the packet's source address and destination address. In step 31, Am_I_Destination, the central controller checks whether the destination address of the data packets is the central controller's address (32, Am_I_Destination=TRUE), or whether the data packets have to be forwarded to another device (35, Am_I_Destination=FALSE). In case the destination of the data packets is the central controller itself, the controller passes the data packets to its own convergence layer. This is done in step 33, Send_Data_to_higher_layer. Then, the controller enters the wait_for_data mode 34.

In case the destination of the packets is not the central controller itself (35, Am_I_Destination=FALSE), the central controller reflects the data packets in step 36, Reflect_data_on_network, to the data packets' destination address. In step 37, Is_destination_default_route, the controller checks whether the data packets' destination is an external network or not. The so-called default route is the address of external devices. All the data traffic to and from these devices is routed via the network's gateway device. In case the destination of the data packets is a device of the ad-hoc network (38, Is_destination_default_route=FALSE), the controller enters the wait_for_data mode 39.

In case the destination of the data packets is the default route (40, Is_destination_default_route =TRUE), it would be advantageous to transfer the control functionality to the gateway device. Before the handover is initiated, the central controller checks, in step 41, Is_gateway_controller_capable, whether the gateway device is a controller-capable device or not. This information is obtained from a local database maintained by the central controller. In case the gateway device is not controller-capable (42, Is_gateway_controller_capable=FALSE), it is not possible to perform a handover, and the central controller enters the wait_for_data mode 39.

In case the gateway device is controller-capable (43, Is_gateway_controller_capable =TRUE), a handover of the control functionality from the central controller to the controller-capable gateway device is initiated. In step 44, a controller handover request Send_Controller_Handover_Req is sent from the central controller to the gateway device. Then, the central controller enters the wait_for_handover mode 45. Before the handover of the control functionality can be performed, the gateway device has to accept becoming the network's new central controller by sending a controller handover acknowledgement to the central controller. In step 46, Receive_Controller_Handover_Ack, the central controller receives the acknowledgement of the controller-capable gateway device.

In step 47, Execute_Handover, the control functionality is transferred from the central controller to the gateway device, which becomes the new central controller. Additionally, the database is transferred from the former central controller to the new central controller. As soon as the controller-capable gateway device acts as the new central controller, it also assumes the responsibility for maintaining and updating the database.

In step 48, Disable_Controller_Functions, the former central controller stops acting as a controller of the network. The former central controller sends a notification to all the devices of the network in order to inform these devices that they are no longer controlled by the former central controller. The former central controller becomes a terminal device that is associated with the network and that is controlled by the new central controller. In step 49, the routine is ended.

In the embodiment shown in FIG. 3, it is only possible to transfer the network's control functionality to a gateway device. The invention is not limited to this embodiment, though. In order to avoid reflected data streams, the control functionality may be transferred to any terminal device, if this terminal device is involved in a lot of reflected data traffic.

The invention claimed is:

1. A method for optimizing data traffic in an ad-hoc established device network including a central controller and a set of terminal devices, the method comprising:
    monitoring the data traffic in order to determine, with respect to a specific terminal device, which amount of the data traffic from said specific terminal device and/or to said specific terminal device is routed via said central controller;
    checking whether said specific terminal device is capable of acting as a controller if at least a predefined amount of the data traffic from said specific terminal device and/or to said specific terminal device is routed via said central controller; and
    performing a handover of the control functionality in order to establish said specific terminal device as the new central controller if said specific terminal device is capable of acting as a controller.

2. The method according to claim 1, further comprising:
    associating the former central controller as a terminal device with the new central controller.

3. The method according to claim 1, further comprising:
    tracking, on part of the central controller, the source addresses of data packets in order to determine which amount of the data traffic from said specific terminal device is routed via said central controller.

4. The method according to claim 3, further comprising:
    counting, on part of the central controller, the occurrence of the address of said specific terminal device whenever said address is used as a source address of a data packet.

5. The method according to claim 1, further comprising:
    tracking, on part of the central controller, the destination addresses of data packets in order to determine which amount of the data traffic to said specific terminal device is routed via said central controller.

6. The method according to claim 5, further comprising:
    counting, on part of the central controller, the occurrence of the address of said specific terminal device whenever said address is used as a destination address of a data packet.

7. The method according to claim 1, wherein said specific terminal device is a gateway device which connects the device network with an external network.

8. The method according to claim 7, further comprising:
    monitoring, on part of the central controller, the inbound data traffic—which is received by said gateway device from the external network, and which is routed via the central controller to a destination device.

9. The method according to claim 7, further comprising:
    monitoring, on part of the central controller, the outbound data traffic which is routed via the central controller from a source device to said gateway device, and which is sent by said gateway device to the external network.

10. The method according to claim 1, wherein checking whether said specific terminal device is capable of acting as a controller is performed with a database which is kept on part of the central controller.

11. The method according to claim 10, further comprising:
adding a new record to said database when a new terminal device is associated with the device network.

12. The method according to claim 1, further comprising:
notifying each device of the network that it is no longer controlled by the former central controller, and that it is subsequently controlled by the new central controller, whenever a handover of the control functionality is performed.

13. The method according to claim 1, wherein the network is a wireless network.

14. The method according to claim 13, wherein the network is a wireless network according to the HIPERLAN/2 standard.

15. A central controller for controlling a set of terminal devices in an ad-hoc established device network, comprising:
a monitoring unit configured to monitor the data traffic in order to determine, with respect to a specific terminal device, which amount of the data traffic from said specific terminal device and/or to said specific terminal device is routed via said central controller;
a checking unit configured to check whether said specific terminal device is capable of acting as a controller; and
a handover unit configured to perform a handover of the control functionality to said specific terminal device in case that at least a predefined amount of the data traffic from said specific terminal device and/or to said specific terminal device is routed via said central controller.

16. The central controller according to claim 15, further comprising:
means for tracking the source addresses of data packets in order to determine which amount of the data traffic from said specific terminal device is routed via said central controller.

17. The central controller according to claim 15, further comprising:
means for tracking the destination addresses of data packets in order to determine which amount of the data traffic to said specific terminal device is routed via said central controller.

18. The central controller according to claim 15, wherein said specific terminal device is a gateway device which connects the device network with an external network.

19. The central controller according to claim 15, further comprising:
a database for storing information about the controller capability of said terminal devices.

20. The central controller according to claim 19, further comprising:
means for adding a new record to said database whenever a new terminal device is associated with the network.

21. A gateway device for connecting an ad-hoc established device network with an external network, said device network including a central controller and a set of terminal devices operably linked to the central controller, said gateway device comprising:
a handover unit configured to switch between a first operating mode and a second operating mode, wherein in said first operating mode inbound data traffic which is received by said gateway device from the external network is routed via the central controller to a destination device and wherein in said second operating mode said gateway device is configured to perform as a new central controller after performing a handover of the control functionality from said central controller,
wherein at least one of the central controller or the gateway device is configured to monitor an amount of the inbound data traffic and to instruct the handover unit to switch from the first operating mode to the second operating mode when the amount of the inbound data traffic reaches a predetermined value.

22. A gateway device for connecting an ad-hoc established device network with an external network, said device network including a central controller and a set of terminal devices operably linked to the central controller, said gateway device comprising:
a handover unit configured to switch between a first operating mode and a second operating mode, wherein in said first operating mode outbound data traffic which is routed via said central controller from a source device to said gateway device is sent by said gateway device to said external network and wherein in said second operating mode said gateway device is configured to perform as a new central controller after performing a handover of the control functionality from said central controller,
wherein at least one of the central controller or the gateway device is configured to monitor an amount of the outbound data and to instruct the handover unit to switch from the first operating mode to the second operating mode when the amount of the outbound traffic data reaches a predetermined value.

* * * * *